Aug. 19, 1958 E. G. ANGER ET AL 2,848,604
WELDER CONTROL
Filed June 23, 1953
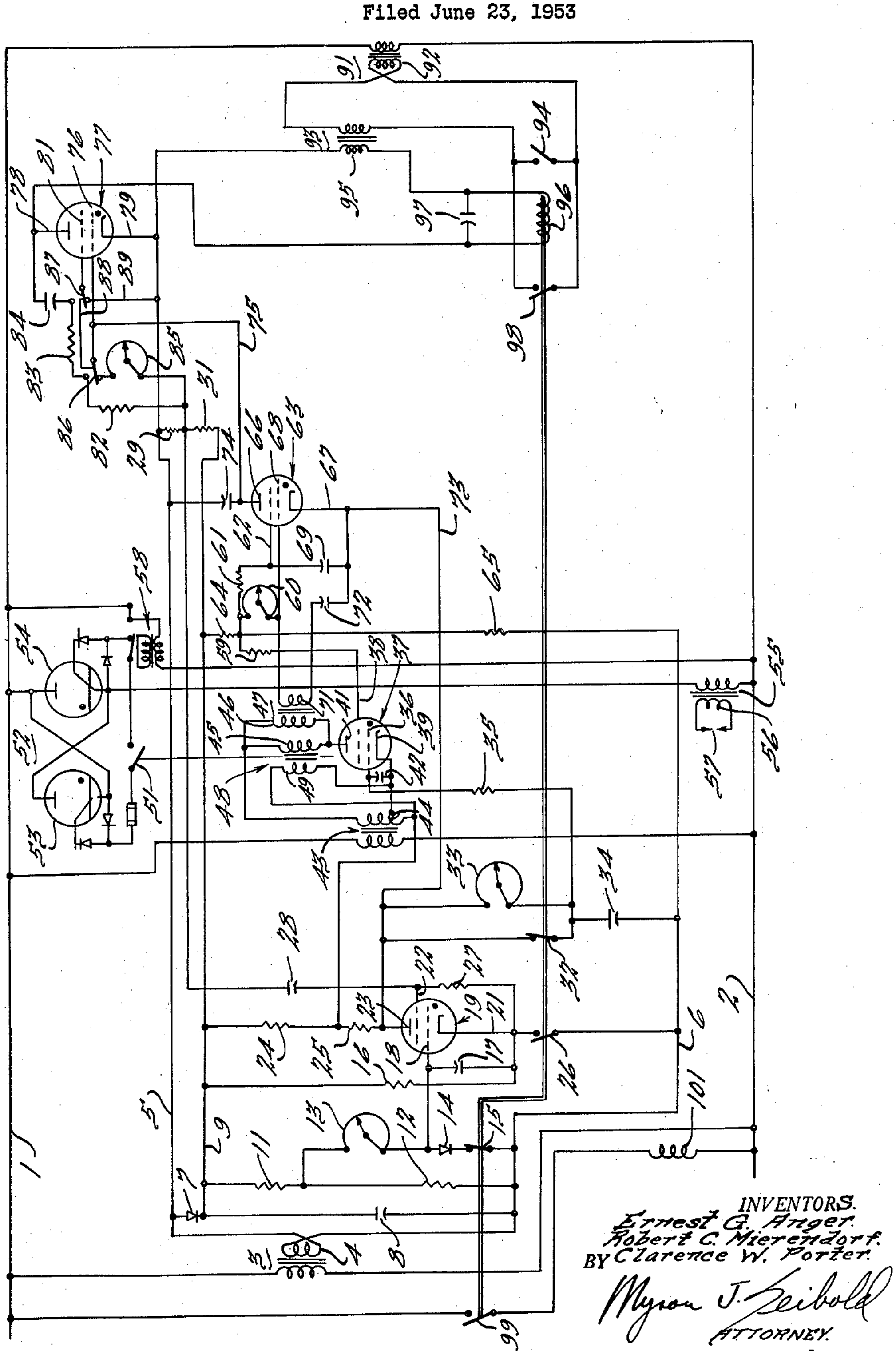
INVENTORS.
Ernest G. Anger.
Robert C. Mierendorf.
BY Clarence W. Porter.
Myron J. Seibold
ATTORNEY.

United States Patent Office 2,848,604
Patented Aug. 19, 1958

2,848,604

WELDER CONTROL

Ernest G. Anger, Wauwatosa, and Robert C. Mierendorf and Clarence W. Porter, Milwaukee, Wis., assignors to Square D Company, Detroit, Mich., a corporation of Michigan Application June 23, 1953, Serial No. 363,468

7 Claims. (Cl. 250—27)

This invention relates to an improved electrical control circuit, and more particularly to an electronic welder control circuit. In many prior control circuits there are disposed electronic tubes, each being associated with a capacitor and a pair of switches, one of which is normally open while the other is normally closed. These components are so disposed in relation to the associated source of electrical energy that the capacitor is charged while the switches are in their normal condition, dissipating means being provided in association with the capacitor which are operative subsequent to a change in the normal condition of the switches so that the charge on the capacitor is gradually decreased, the associated electronic tube beginning to conduct after the charge of the capacitor has reached a predetermined low level. In such circuits, the switches were ideally arranged such that the normally closed switch opened before the normally opened switch closed. These previous circuits, however, were subject to the difficulty that the controlled tube would conduct current immediately if both switches were closed, even for an instant, and in practice this occasionally occurred, the result being immediate conduction of the controlled tube.

One object of the present invention is to obviate this particular difficulty so that even if both switches in such a circuit are momentarily in a "closed" condition at the same time, the controlled tube will not immediately be rendered conductive.

Further, in many prior circuits, switches were provided which were controlled by the energization of a relay coil through which current would pass in half cycle pulses supplied by virtue of conduction through an electronic tube. In such circuits, capacitors and inductors were frequently employed to insure "hold in" of the relay during the half cycles following conducting half cycles of the tube, and to insure rapid and accurate deenergization of the relay at the end of the period during which the tube may be rendered conducting.

Another object of the present invention is the provision of a new and improved relay circuit for association with an electronic tube whereby such capacitors are eliminated without sacrificing any feature of prior circuits.

Another object of the present invention is the provision of a circuit in accordance with the preceding object in which a double winding is provided on a relay, one of the coils being energized by current through an associated electronic tube while the other coil is energized by a separate source, or is short-circuited.

Another object of the present invention is the provision of a control circuit employing a minimum number of tubes of a single type for effecting electronic welder control.

Another object of the present invention is the provision of an electronic welder control in which an improved safety feature is incorporated which operates to terminate the flow of welding current without dependence upon the conduction of any electronic tube.

Other objects and features of the present invention will be readily apparent to those skilled in the art from the specification and appended drawing illustrating certain preferred embodiments in which the figure is a diagrammatic representation of an improved electronic welder control circuit incorporating the present invention.

In the figure, there is disclosed a pair of main supply lines 1 and 2 normally connected to a source of electrical energy which is not illustrated. Connected between these lines is the primary winding of a transformer 3 having a secondary winding 4 which supplies electrical energy to a pair of supply lines 5 and 6. Connected between lines 5 and 6 are a rectifier 7 and a capacitor 8, a line 9 being connected to the junction between the elements 7 and 8 so that a D. C. voltage appears between the lines 6 and 9.

Serially connected between the lines 6 and 9 are a pair of resistors 11 and 12, and electrically connected to a point intermediate these resistors is one terminal of a rheostat 13. The opposite terminal of the rheostat 13 is connected to a rectifier 14 which is connected to the line 6 through a normally closed switch 15.

Connected to the line 9 is one side of a resistor 16, the opposite side of which is connected to one terminal of a capacitor 17. The opposite side of the capacitor 17 is electrically connected to a point intermediate the rheostat 13 and the rectifier 14, and to the control grid 18 of an electronic tube 19. The tube 19 has a cathode 21, a shield grid 22, and an anode 23. As will be seen from the figure, the anode 23 of the tube 19 is connected to line 9 through serially connected resistors 24 and 25. A normally open switch 26 is provided for connecting the cathode circuit of the tube 19 to the line 6. Connected between the cathode 21 and shield grid 22 of tube 19 is a resistor 27, shield grid 22 being also electrically connected to one terminal of a capacitor 28, the opposite terminal of which is electrically connected to a junction point between serially connected resistors 29 and 31 and disposed between the lines 5 and 9.

Electrically connected to anode 23 of tube 19 is a normally closed switch 32, paralleled by a rheostat 33, a capacitor 34 being provided between this parallel circuit and the line 6. To one terminal of the capacitor 34 there is electrically connected a resistor 35, the opposite terminal of which is electrically connected to the control grid 36 of an electronic tube 37. Tube 37 is provided with a shield grid 38, cathode 39, and an anode 41. Between control grid 36 and cathode 39 is a capacitor 42.

For providing electrical energy to the tube 37, there is connected across the main supply lines 1 and 2 the primary winding of a transformer 43, having a secondary winding 44 electrically connected between the cathode 39 and the anode 41 of the tube 37. The electrical connection between the secondary winding 44 of the transformer 43 and the anode 41 of the tube 37 is through a parallel circuit comprising a main relay coil 45 and a primary winding 46 of a transformer 47.

The main relay coil 45 forms part of a relay indicated generally at 48 which also includes an auxiliary winding 49 which, as shown in the figure, is connected across a portion of the secondary winding 44 of transformer 43. The relay 48 controls the operation of a normally open switch 51 disposed to control the passage of current through a conventional, back-to-back ignitron contactor indicated generally at 52. The contactor 52 comprises a pair of ignitrons 53 and 54 connected in inverse parallel between the supply lines 1 and 2 through the primary winding of a welding transformer 55 having a secondary winding 56 connected to electrodes 57. The electrodes 57 are relatively movable in response to the energization of an electromagnetic coil, to be subsequently explained. The contactor 52 is provided with a thermal flow switch 58, of conventional nature, which protects the ignitrons from overheating.

To the shield grid 38 of the tube 37 there is connected a resistor 59, connected through a second resistor 61 to the shield grid 62 of an electronic tube 63. Interposed between the line 9 and the junction between resistors 59 and 61 is a resistor 64 which is serially connected with a resistor 65 to the line 6. Tube 63 has an anode 66, a cathode 67, and a control grid 68, as illustrated in the figure, and electrically connected between control grid 68 and the junction between resistors 64 and 65 is a rheostat 60. Between the shield grid 62 and the cathode 67 of tube 63 is positioned a capacitor 69, and connected between the control grid 68 and the cathode 67 is a serial connection comprising a secondary winding 71 of the transformer 47 and a capacitor 72. As illustrated in the figure, a conductor 73 interconnects the cathode 67 of the tube 63 and the anode 23 of the tube 19.

Connected to the anode 66 of tube 63 is a capacitor 74, also connected to the line 5. A conductor 75 electrically interconnects the anode 66 of the tube 63 and the control grid 76 of an electronic tube 77. Tube 77 has an anode 78, a cathode 79, and a shield grid 81. The anode 78 of the tube 77 is electrically connected to the junction point between resistors 29 and 31 through a serial connection comprising resistors 82 and 83 and capacitor 84. In the figure, the control grid 76 is electrically connected to the same junction point through a rheostat 85 and contact 86 of a two-position "repeat" switch 88, the contacts 86 and 87 of which are "ganged." In the position of the repeat switch 88 illustrated in the figure, the shield grid 81 of the tube 77 is electrically connected to the cathode 79 through a conductor 89.

Also disposed across the main supply lines 1 and 2 is the primary winding of a transformer 91 having a secondary winding 92. Across the winding 92 is connected the primary winding of a transformer 93 through a normally open initiating switch 94. The transformer 93 has a secondary winding 95 which is connected between the anode 78 and cathode 79 of the tube 77 through the operating coil of a relay 96. A capacitor 97 is connected in parallel with the winding of relay 96 to prevent chattering. Paralleling the initiating switch 94 is a normally open switch 98, controlled by energization of the relay 96, which when closed forms a "non-beat" circuit around the switch 94. Relay 96 also controls the operation of a normally open switch 99 which is operative to connect a winding 101 between the main supply lines 1 and 2. Energization of the winding 101 controls the operation of pneumatic apparatus for effecting movement of the welding electrodes 57 in conventional manner. Switches 15, 26 and 32 are also operated, as shown, by relay 96.

In the above description of the diagrammatic representation shown in the figure, certain conventional elements such as pressure switches, cathode heating circuits, etc., have ben omitted inasmuch as the position and operation of these and similar elements are well known to those familiar with the art, this omission having been made for purposes of simplification.

In the following list, there is given an example of one set of components values useful in a construction of the present invention. Obviously, components having other values could also be assembled and utilized within the scope of the present invention.

| | | |
|---|---|---|
| Resistors: | | |
| **11** | ohms | 68K |
| **12** | do | 18K |
| **13** | megohms | 2 |
| **16** | ohms | 27K |
| **24** | do | 12K |
| **25** | do | 1.8K |
| **27** | megohms | 22 |
| **29** | ohms | 27K |
| **31** | do | 470K |
| **33** | megohms | 2 |
| **35** | do | 2.2 |
| **59** | ohms | 220K |
| **60** | megohms | 2 |
| **61** | do | 4.7 |
| **64** | ohms | 6.8K |
| **65** | do | 6.8K |
| **82** | do | 120K |
| **83** | do | 180K |
| **85** | megohms | 2 |
| Capacitors: | | Mfd. |
| **8** | | 20 |
| **17** | | .5 |
| **28** | | .001 |
| **34** | | .5 |
| **42** | | .001 |
| **69** | | .0047 |
| **72** | | .5 |
| **74** | | .35 |
| **84** | | .05 |
| **97** | | 8 |
| Tubes: **19**, **37**, **63** and **77** | | 2050 |

When the main supply lines 1 and 2 are connected to a suitable source of electrical energy, and before the closure of the initiating switch 94, an A. C. voltage will appear between lines 1 and 2, while a D. C. voltage will appear between lines 9 and 6. Inasmuch as the switch 99 is open, the coil 101 is deenergized and the welding electrodes 57 are consequently separated. The capacitor 34 is charged to approximately the voltage between lines 6 and 9 through resistors 24 and 25 and the normally closed switch 32. Capacitors 72 and 69 are charged to a potential determined by the voltage dividing action of resistors 64 and 65, capacitor 72 being charged through resistors 24, 25 and rheostat 60, while capacitor 69 is charged through resistors 24, 25 and 61. In this condition, none of the tubes are energized so as to conduct current, tubes 19 and 63 being prevented from conducting by lack of positive anode voltage, while tube 37 is prevented from firing by the substantial, relative negative voltage of the shield grid 38 thereof. Tube 77 is nonconducting in view of the lack of voltage impressed thereacross, while the ignitrons 53 and 54 are deenergized in view of the open condition of the switch 51.

Upon operation of the initiating contact 94, the circuit is completed through the primary winding of transformer 93, so that the secondary winding 95 thereof applies voltage between the anode and the cathode of the tube 77 which thereby conducts to energize the coil of the relay 96. This energization effects closure of the switch 99, whereby the coil 101 is energized so that the electrodes 57 begin to apply pressure to the work. The normally closed switch 15 is opened as is the normally closed switch 32, while the normally open switches 26 and 98 are closed. Ideally, the normally closed switches will open before the normally open switches close.

"Squeeze timing" is initiated when the switch 15 opens and the switch 26 closes. A substantial voltage difference between the anode 23 and the cathode 21 of the tube 19 then exists. Tube 19 cannot conduct immediately, however, in view of the charged condition of the capacitor 17, and tube 19 will not conduct until the charge on capacitor 17 has been sufficiently dissipated. The rate of this dissipation is controlled by the setting of the rheostat 13. It should be noticed that even though the switch 26 closes before the switch 15 opens, a condition which sometimes occurs in actual practice, so that switches 15 and 26 are both momentarily in a "closed" condition, tube 19 cannot conduct immediately inasmuch as capacitor 17 directly interconnects the control grid 18 and the cathode 21 of the tube 19 and the rectifier 14 so disposed as to prevent short circuiting of this capacitor 17 through switches 26 and 15.

Capacitor 17, as previously indicated, discharges at a rate set by rheostat 13, and when sufficiently discharged permits control grid 18 of tube 19 to assume a positive potential. Tube 19 will then be rendered conducting at an instant thereafter determined by a positive, synchronized excursion of the shield grid 22 voltage. As may be seen from the figure, this will occur when line 2 is positive with respect to line 1.

Upon conduction of the tube 19, the cathode 39 of tube 37 is rendered negative with respect to the control grid 36 and the shield grid 38 of that tube. Tube 37 will, therefore, begin to conduct during the following half cycle when its anode becomes positive. Conduction of tube 37 effects energization of the main coil 45 of the relay 48, and of the primary winding 46 of the transformer 47, as will be subsequently explained. As tube 37 begins to conduct during a half cycle of voltage in which line 1 is positive, the main winding 45 of the relay 48 is energized, whereupon the switch 51 in the ignitron contactor 52 is closed. The adjustment of the mechanical delay of the relay 48 causes the switch 51 operated thereby to close at a predetermined moment, approximately three-quarters of a cycle following the point of initial conduction of the tube 37. This selected point is at current zero time for the average power factor welding load so that welding current flow begins with a minimum of transient for a normal range of welder power factors. Ignitrons 53 and 54 will subsequently conduct alternate half cycles of current, as understood by those familiar with the art, during succeeding half cycles in which switch 51 remains closed, causing current to flow through the welding transformer 55 and consequently through the electrodes 57 and the work interposed therebetween.

In order to insure that the switch 51 will remain closed during those half cycle periods following half cycles during which the tube 37 conducts, an auxiliary winding 49 is provided on the relay 48, which is energized by the secondary winding 44 of the transformer 43. This auxiliary winding 49 is so arranged and energized as to maintain the relay 48 sufficiently energized so that the contact 51 will stay closed during half cycles which immediately follow conducting half cycles of the tube 37, the contact 51 opening during the second half-cycle following the last half cycle of tube 37 conduction. The switch 51 will, therefore, remain closed so that ignitron contactor 52 will pass even numbers of half cycles of current, whereby saturation of the welding transformer is obviated.

The length of time during which tube 37 conducts current is determined by the charge on the capacitor 34. As previously explained, before the operation of the initiating switch 94, capacitor 34, is charged to the voltage between lines 6 and 9. Subsequent to the operation of the initiating switch 94, and consequent opening of the normally closed switch 32, the charge on capacitor 34 is maintained through resistors 24 and 25, and the rheostat 33, until tube 19 begins to conduct. Upon conduction of tube 19, the charge on capacitor 34 is dissipated therethrough at a rate determined by the setting of the rheostat 33, until such time that the control grid 36 of the tube 37 becomes sufficienly negative to prevent further conduction of the tube 37. It is apparent that termination of conduction of tube 37 does not depend upon the conduction of any other tube.

When tube 19 begins to conduct current, the cathode 67 of the tube 63 becomes negative with respect to the anode 66 of that tube, but tube 63 is not rendered immediately conducting due to the charge on capacitor 72. Tube 19 conduction prevents further charging of capacitors 72 and 69 through conductor 73. During that period in which tube 37 conducts, however, the charge on capacitor 72 is maintained by virtue of control grid conduction of the tube 63 induced by energization of the transformer 47, and consequent energization of its secondary winding 71. At the end of the period during which tube 37 conducts, however, the capacitor 72 begins to discharge at a rate determined by the setting of the rheostat 60. The control grid 68 of the tube 63 therefore becomes gradually less negative at this rate, and finally tube 63 conducts current to charge the capacitor 74. The voltage dividing resistors 64 and 65 insure a positive potential on the shield grid 62 and control grid 68 of the tube 63 after capacitor 72 has discharged so as to guarantee conduction of the tube 63.

Upon conduction of tube 63, the charge placed thereby upon the capacitor 74 is of such nature as to terminate further conduction by the tube 77. Cessation of current flow through tube 77 effects the deenergization of the coil of relay 96, whereby the switches 99, 15, 26, 32 and 98 return to the condition illustrated in the figure. Opening of the switch 99 deenergizes the valve solenoid 101 which effects release of the welding electrode 57 pressure. The return of the other switches to the condition illustrated in the figure stops the conduction of tubes 19 and 63 and permits the capacitors 17, 34 and 72 to be recharged so as to be ready for another weld sequence.

With the repeat switch 88 in the position indicated in the figure, the charge on capacitor 74 is dissipated at a rate determined by the setting of rheostat 85. Should the initiating switch 94 be held closed during the period in which the charge on capacitor 74 is dissipated, when that charge is sufficiently small, the tube 77 will again conduct current and initiate another weld sequence as previously described. If the switch 94 is not held closed, the charge on capacitor 74 will, of cours, dissipate as previously described at a rate determined by the rheostat 85 so that subsequent closure of the switch 94 will initiate a weld sequence.

With the repeat switch 88 in its other possible position—the "non-repeat" position—when the tube 77 is cut off, and the initiating switch 94 held closed, the shield grid 81 of the tube 77 functions as a half-way rectifier to the A. C. voltage fed through the coil of relay 96 and capacitor 84 which is filtered by resistor 83 and capacitor 74 so as to appear as a D. C. voltage on the control grid 76 sufficiently negative to prevent tube 77 conduction. When the initiating switch 94 is opened, the negative voltage of capacitor 74 quickly bleeds off through resistor 82 and 29 so that the tube 77 is again ready to conduct when the initiating switch 94 is closed.

It will therefore be seen that applicants have provided a new and improved control circuit particularly useful in controlling the sequence of welders. This circuit is so constructed and arranged that inadvertent simultaneous closure of contacts operated by a relay does not operate to destroy the normal sequencing of the circuit. Further advantages are obvious in the new and improved circuit comprising an electronic tube-relay combination in which the relay is provided with a main coil energized by the electronic tube and a secondary coil which operates to keep the control contact closed during those half cycles which follow the half cycles during which the electronic tube conducts. It will further be seen that the circuit of applicants' invention does not require a tube to conduct to interrupt weld current flow, and also that a minimum number of tubes of a single type are employed to effect the sequencing of the system.

While a certain preferred embodiment of the invention has been specifically disclosed, it is understood that the invention is not limited thereto, as many variations will be readily apparent to those skilled in the art and the invention is to be given its broadest possible interpretation within the terms of the following claims:

What is claimed is:

1. In a control circuit, an electronic tube having a pair of principal electrodes and a control electrode, means for controlling the initiation of conduction through said tube comprising a capacitor, means connecting said capacitor to said control electrode, and one of said principal electrodes, a normally closed switch, a normally open switch, means for effecting operation of said switches, means for charging said capacitor through said normally closed switch, means for discharging said capacitor at predetermined rates through said normally open switch only after operation of both said switches whereby a timed period is determined, and means preventing conduction of said tube during momentary intervals during which both of said switches are in closed condition.

2. The circuit of claim 1 in which said means preventing conduction comprises a rectifier in series with said normally closed switch to prevent discharge of the capacitor through the circuit including both said switches.

3. In a control circuit, an electronic tube having a pair of principal electrodes and a control electrode, means for controlling the initiation of conduction through said tube comprising a capacitor, means connecting said capacitor to said control electrode and one of said principal electrodes, a normally closed switch, a normally open switch, means for effecting operation of said switches, means connecting one of said principal electrodes to a point of first potential, means including said normally open switch connecting the other of said principal electrodes to a point of different potential whereby operation of said normally open switch effects a potential difference between the principal electrodes of said tube, means including said normally closed switch for charging said capacitor whereby operation of said switches stops the charging of said capacitor, means for discharging said capacitor through said normally open switch at predetermined rates after operation of said switches whereby a timed period is determined, and means preventing short circuiting of said capacitor when both of said switches are in closed condition.

4. In a control circuit, an electronic tube having an anode, a cathode, and a control grid, means for controlling the initiation of conduction through said tube comprising a capacitor, means connecting said capacitor between said cathode and control grid, a normally closed switch, a normally open switch, means for normally effecting sequential operation of said switches, a circuit including said normally closed switch for charging said capacitor whereby operation of said switches stops the charging of said capacitor, means for discharging said capacitor through said normally open switch at predetermined rates whereby a timed period is determined, means connecting said anode to a point of first potential, means for connecting said cathode through said normally open switch to a point of lower potential whereby operation of said normally open switch effects a potential difference between the anode and cathode of said tubes, and rectifying means preventing short circuiting of said capacitor when both switches are in closed condition.

5. In a control circuit, an electronic tube having a pair of principal electrodes and a control electrode, means for controlling the initiation of conduction through said tube comprising a capacitor, means connecting said capacitor to said control electrode and one of said principal electrodes, a normally closed switch, a normally open switch, means for effecting operation of said switches, means for charging said capacitor through said normally closed switch, means for discharging said capacitor through said normally open switch at a predetermined rate and only after operation of both said switches, an abnormal short circuit discharge path for said condenser when both said switches are in closed condition and a rectifier in said abnormal path polarized to permit charging of said condenser but preventing discharge through said path.

6. In a control circuit, an electronic tube having a pair of principal electrodes and a control electrode, means for controlling the initiation of conduction through said tube comprising a capacitor, means connecting said capacitor to said control electrode and one of said principal electrodes, a normally closed switch, a normally open switch, means for effecting operation of said switches, an alternating current supply, a first rectifier means supplying direct current from said supply means for charging said capacitor with said direct current through said normally closed switch, means for discharging said capacitor through said normally open switch at a predetermined rate and only after operation of both said switches, an abnormal short circuit discharge path for said condenser when both said switches are in closed condition and a second rectifier in series with said normally closed switch polarized to permit charging of said condenser and preventing discharge thereof through said abnormal path when both switches are in closed condition.

7. In a control circuit, a first electronic tube having an anode, a cathode, and a control grid, means connecting the anode and cathode of the tube across a source of energy, a capacitor, means for charging the capacitor, means connecting the capacitor to the control grid, a second electronic tube having an anode, means connecting the capacitor and cathode to the anode of the second tube and responsive to conduction of the second tube to simultaneously interrupt the charging of the capacitor and to change the potential of the cathode of the first tube to a level below that of the control grid whereby the first tube will conduct when the anode is positive with respect to said cathode, and means for discharging said capacitor through an RC circuit through said second tube at a predetermined rate, said means being arranged to permit the level of potential of said control grid to diminish until said first tube is prevented from further conduction while said second tube continues to conduct.

References Cited in the file of this patent

UNITED STATES PATENTS

| | | |
|---|---|---|
| 2,006,737 | Gessford | July 2, 1935 |
| 2,008,413 | Dawson | July 16, 1935 |
| 2,112,736 | Cockrell | Mar. 29, 1938 |
| 2,124,410 | Cockrell | July 19, 1938 |
| 2,147,472 | Ulrey | Feb. 14, 1939 |
| 2,171,347 | Schneider | Aug. 29, 1939 |
| 2,242,897 | Staggs | May 20, 1941 |
| 2,251,763 | Schone | Aug. 5, 1941 |
| 2,252,530 | Sweeney et al. | Aug. 12, 1941 |
| 2,390,774 | Burgwin et al. | Dec. 11, 1945 |
| 2,418,425 | Poch | Apr. 1, 1947 |
| 2,446,719 | Ray | Aug. 10, 1948 |
| 2,473,640 | Faulk | June 21, 1949 |
| 2,487,150 | Lexa | Nov. 8, 1949 |
| 2,503,835 | Montgomery | Apr. 11, 1950 |
| 2,574,253 | Duffy | Nov. 6, 1951 |

FOREIGN PATENTS

| | | |
|---|---|---|
| 448,833 | Great Britain | June 16, 1936 |